United States Patent
Yang et al.

(10) Patent No.: US 12,046,243 B2
(45) Date of Patent: Jul. 23, 2024

(54) ELECTRONIC APPARATUS AND METHOD FOR CONTROLLING ELECTRONIC APPARATUS THEREOF

(71) Applicant: SAMSUNG ELECTRONICS CO., LTD., Suwon-Si (KR)

(72) Inventors: Jaechul Yang, Suwon-si (KR); Hyunwoo Park, Suwon-si (KR); Hyungrai Oh, Suwon-si (KR); Jongsun Abbas Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 17/437,903

(22) PCT Filed: Aug. 20, 2021

(86) PCT No.: PCT/KR2021/011096
§ 371 (c)(1),
(2) Date: Sep. 10, 2021

(87) PCT Pub. No.: WO2022/055147
PCT Pub. Date: Mar. 17, 2022

(65) Prior Publication Data
US 2022/0328045 A1    Oct. 13, 2022

(30) Foreign Application Priority Data
Sep. 11, 2020    (KR) .................. 10-2020-0116934

(51) Int. Cl.
*G10L 15/26*    (2006.01)
*G06F 40/279*    (2020.01)
*G10L 15/06*    (2013.01)

(52) U.S. Cl.
CPC ............ *G10L 15/26* (2013.01); *G06F 40/279* (2020.01); *G10L 15/06* (2013.01)

(58) Field of Classification Search
CPC ........ G10L 15/26; G10L 15/06; G06F 40/279
See application file for complete search history.

(56) References Cited

U.S. PATENT DOCUMENTS

| 5,797,123 A |   | 8/1998 | Chou et al. |
| 7,343,597 B1 | * | 3/2008 | Smith ................. G06F 8/43 |
|   |   |   | 717/151 |

(Continued)

FOREIGN PATENT DOCUMENTS

| CN | 110705267 A | 1/2020 |
| CN | 111008532 A | 4/2020 |

(Continued)

OTHER PUBLICATIONS

International Search Report and Written Opinion dated Nov. 10, 2021 in corresponding International Application No. PCT/KR2021/011096.

(Continued)

*Primary Examiner* — Bryan S Blankenagel
(74) *Attorney, Agent, or Firm* — Nixon & Vanderhye, P.C.

(57) ABSTRACT

Provided herein are an electronic apparatus and a method for controlling thereof. The method for controlling an electronic apparatus may include: acquiring a voice command, performing voice recognition of the voice command and acquiring a first text, identifying a prestored indexed word among a plurality of words included in the first text, identifying a rule template among a plurality of prestored rule templates including the indexed word and slots matched to at least one word excluding the indexed word among the plurality of words, and acquiring a control command corresponding to the voice command based on the identified rule template.

11 Claims, 9 Drawing Sheets

(56) References Cited

U.S. PATENT DOCUMENTS

| | | | |
|---|---|---|---|
| 7,603,267 B2 | 10/2009 | Wang et al. | |
| 8,600,748 B2 | 12/2013 | Roberge et al. | |
| 2011/0179075 A1* | 7/2011 | Kikuchi | G06F 16/93 |
| | | | 707/769 |
| 2012/0191453 A1 | 7/2012 | Roberge et al. | |
| 2013/0246199 A1* | 9/2013 | Carlson | G06Q 20/405 |
| | | | 705/16 |
| 2014/0185933 A1* | 7/2014 | Tian | G07D 7/2083 |
| | | | 382/173 |
| 2016/0125873 A1* | 5/2016 | Braho | G10L 15/07 |
| | | | 704/239 |
| 2016/0171977 A1 | 6/2016 | Siohan et al. | |
| 2019/0370342 A1 | 12/2019 | Luke et al. | |
| 2020/0019609 A1* | 1/2020 | Yu | G06F 40/186 |
| 2020/0160863 A1 | 5/2020 | Lee et al. | |

FOREIGN PATENT DOCUMENTS

| | | |
|---|---|---|
| KR | 10-1120858 | 6/2012 |
| KR | 10-1195812 | 11/2012 |
| KR | 10-1834564 | 2/2018 |
| KR | 10-2019-0011458 | 2/2019 |
| KR | 10-2020-0059054 | 5/2020 |

OTHER PUBLICATIONS

[Online] Extending Training with Vocabulary, [https://bixbydevelopers.com/dev/docs/dev-guide/developers/training.vocabulary], Jun. 17, 2020, 8 pages.

* cited by examiner

ELECTRONIC APPARATUS AND METHOD FOR CONTROLLING ELECTRONIC APPARATUS THEREOF

BACKGROUND

Field

The disclosure relates to an electronic apparatus and a method for controlling thereof, and for example, to an electronic apparatus that identifies a rule template corresponding to a user's voice command among a plurality of prestored rule templates, and a method for controlling thereof.

CROSS-REFERENCE TO RELATED APPLICATION

This application is the U.S. national phase of International Application No. PCT/KR2021/011096 filed Aug. 20, 2021 which designated the U.S. and claims priority under 35 U.S.C. § 119 to Korean Patent Application No. 10-2020-0116934, filed on Sep. 11, 2020, the entire contents of each of which are hereby incorporated by reference.

Description of Related Art

Recently, the amount of information that exists online and offline is increasing exponentially, and with the development of electronic communication technologies, a user can acquire desired information at anytime, anywhere through an electronic apparatus.

In this regard, recently, in order for an electronic apparatus to appropriately perform an operation desired by a user, a command response system that generates a control command corresponding to a user command is being used widely.

Also, recently, an artificial intelligence system implementing artificial intelligence of a human level is being used in various fields, and in various systems within an artificial intelligence system, a command response system is being utilized.

Meanwhile, a conventional command response system may be implemented as a voice assistant based on a server using a deep learning or statistics-based technology, and thus the system needs hardware of a high specification.

Accordingly, there is a rising need for implementing a command response system in an on-device environment of a low specification.

SUMMARY

Embodiments of the disclosure provide an electronic apparatus that provides a rule template corresponding to a voice command by identifying a word indexed in a text included in a user's voice command, and a method for controlling thereof.

An electronic apparatus according to an example embodiment of the disclosure includes: a memory storing at least one command, and a processor connected with the memory and configured to control the electronic apparatus, wherein the processor is configured, by executing the at least one command, to control the electronic apparatus to: acquire a voice command; perform voice recognition of the voice command and acquire a first text; identify an indexed word prestored in the memory from among a plurality of words included in the first text; identify a rule template among a plurality of rule templates prestored in the memory including the indexed word and slots matched to at least one word excluding the indexed word among the plurality of words; and acquire a control command corresponding to the voice command based on the identified rule template.

A method for controlling an electronic apparatus according to an example embodiment of the disclosure comprises: acquiring a voice command; performing voice recognition of the voice command and acquiring a first text; identifying a prestored indexed word among a plurality of words included in the first text; identifying a rule template among a plurality of prestored rule templates including the indexed word and slots matched to at least one word excluding the indexed word among the plurality of words; and acquiring a control command corresponding to the voice command based on the identified rule template.

According to the disclosure, by identifying an indexed word in a text included in a user's voice command, a rule template corresponding to the user's voice command can be effectively identified in prestored rule templates.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, the disclosure will be described in greater detail with reference to the accompanying drawings.

Figure 1:
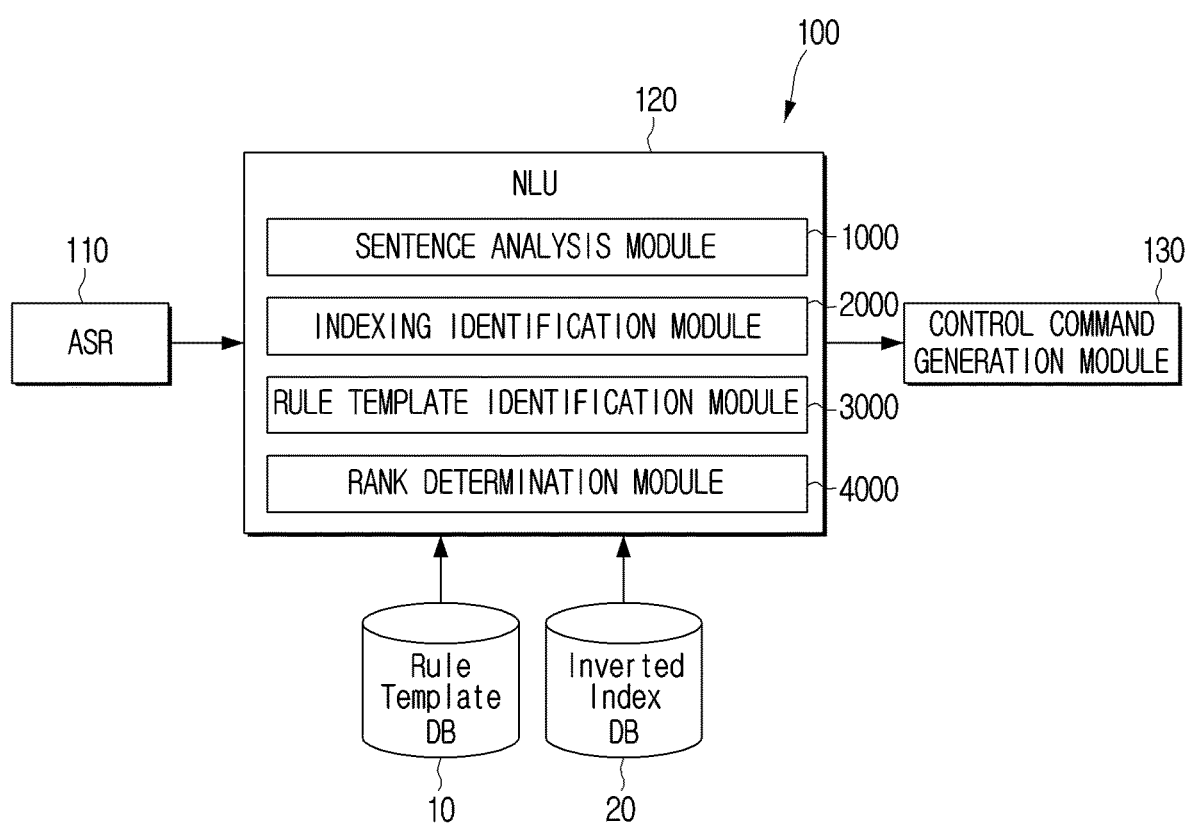
FIG. 1 is a block diagram illustrating an example operation of an electronic apparatus according to various embodiments.

FIG. 1 is a block diagram illustrating an example operation of an electronic apparatus 200 according to various embodiments.

The electronic apparatus 200 (refer to FIG. 2) may include a command response system 100 for performing an operation corresponding to a user's voice command, when a user's voice command is received.

The command response system 100 may analyze a user's voice command such as identifying an indexed word included in the voice command through natural processing, and identify a rule template corresponding to the user's voice command. An indexed word may refer, for example, to a word stored in an inverted index database (DB) 20, and a word stored in the inverted index DB 20 may be stored together with the identification number of a rule template including the word and location information of the word in the rule template, and a more detailed description of such content will be described in greater detail below with reference to FIG. 3.

The electronic apparatus 200 may acquire a control command corresponding to the voice command based on the identified rule template, and perform an operation corresponding to the control command.

For performing the aforementioned operations, the command response system 100 may include an automatic speech recognition (ASR) module (e.g., including various processing circuitry and/or executable program elements) 110, a natural language understanding (NLU) module (e.g., including various processing circuitry and/or executable program elements) 120, and a control command generation module (e.g., including various processing circuitry and/or executable program elements) 130, etc. However, the disclosure is not limited thereto, and the command response system 100 may additionally include necessary components depending on cases.

The electronic apparatus 200 may further include other systems (e.g., a dialogue system) other than the command response system 100, and a more detailed description of such content will be described in greater detail below with reference to FIG. 6.

The automatic speech recognition (ASR) module 110 may include various processing circuitry and/or executable program elements and convert a user voice command received from the electronic apparatus 200 into text data.

For example, the automatic speech recognition module 110 may include utterance recognition. The utterance recognition may include an acoustic model and a language model. For example, the acoustic model may include information related to vocalization, and the language model may include unit phoneme information and information on a combination of unit phoneme information. The utterance recognition may convert a user utterance into text data using the information related to vocalization and the information on the unit phoneme information. The information on the acoustic model and the language model may be stored, for example, in an automatic speech recognition database (ASR DB) (see, e.g., ASR DB 30 in FIG. 6).

The natural language understanding module 120 may include various processing circuitry and/or executable program elements and perform semantic analysis and identify the intent of a user's voice command. For example, the natural language understanding module 120 according to the disclosure may perform semantic analysis using a rule-matching method, and provide a rule template corresponding to a user's voice command.

The natural language understanding module 120 may compare a plurality of respective rule templates including intents and slots necessary for identifying intents with text data corresponding to a user's voice command, and identify the intent of the voice command.

A slot may include information for identifying an intent of a user in a rule template as a parameter necessary for expressing an intent of a rule template. A slot may include an open slot and a close slot. A close slot may refer, for example, to a slot wherein words that can be matched in the slot are limited. For example, a close slot may be generated by designating the type of the close slot as 'a singer,' and limiting words corresponding to 'a singer.' In this example, if words corresponding to 'a singer' limited in the close slot are included in a user's voice command, the electronic apparatus 200 may identify that the text is matched to the close slot. For example, in case a close slot is included in a rule template, the electronic apparatus 200 may identify that the rule template is a rule template corresponding to a user's voice command only if words of the type corresponding to the close slot are included in the words included in the user's voice command.

An open slot may refer, for example, to a slot wherein words that can be matched in the slot are not limited, unlike a close slot. For example, if <SearchTerm> is designated as an open slot, all words included in a user's voice command can be matched in the open slot. Then, through words matched to <SearchTerm>, search may be performed.

The natural language understanding module 120 may include a sentence analysis module (e.g., including various processing circuitry and/or executable program elements) 1000, an indexing identification module (e.g., including various processing circuitry and/or executable program elements) 2000, a rule template identification module (e.g., including various processing circuitry and/or executable program elements) 3000, and a rank determination module (e.g., including various processing circuitry and/or executable program elements) 4000.

The sentence analysis module 1000 may include various processing circuitry and/or executable program elements for acquiring a first text by identifying words included in a user's voice command through text data acquired through the automatic speech recognition module 110.

As an example, if a user's voice command is "Send a message to my eldest son to call me," the sentence analysis module 1000 may analyze text data acquired through the voice command, and identify an example text including five words like "[(to) my eldest son] [call me] [(to)] [a message] [send])."

As an example, the sentence analysis module 1000 may acquire a word which is a generalized form of a verb included in a user's voice command. For example, the sentence analysis module 1000 may generalize the verb "send" included in "Send a message to my eldest son to call me" and acquire a word "send."

As an example, the sentence analysis module 1000 may identify a postposition included in a user's voice command and extend the postposition. That is, the sentence analysis module 1000 may extend the postposition included in "to my eldest son" included in "Send a message to my eldest son to call me" to "for," "toward," etc., and store the phrase as [to my eldest son], [toward my eldest son], and [for my eldest son]. Also, the sentence analysis module 1000 may extend the postposition included in "to" to "for," etc., and store the phrase to [to] and [for].

When a first text is acquired through the sentence analysis module 1000, an indexed word may be identified through the indexing identification module 2000.

The indexing identification module 2000 may include various processing circuitry and/or executable program elements for identifying an indexed word included in a user's voice command.

As an example, a plurality of rule templates may be prestored in a rule template DB 10 for performing a control command corresponding to a user voice command. In the plurality of respective rule templates included in the rule template DB, indexing may be performed for words excluding slots.

Indexing according to the disclosure may refer, for example, to identifying identification numbers of rule templates including at least one word included in the plurality of respective rule templates and the locations of the words in the rule templates, and information wherein the identification numbers of the rule templates including the identified words and the locations of the words in the rule templates are indexed may be prestored in an inverted index DB 20.

For example, if an example rule template is "<SearchTerm> to <MessageText> a message to," the electronic apparatus 200 may identify that the words excluding the slots <SearchTerm> and <MessageText> in the example rule template are [a message] and [send].

In each of the identified indexing words, indexing information such as (x,y) may be prestored in the inverted index DB 20. In (x,y), x may refer, for example, to an identification number of a rule template, and y may indicate the location of the word in the rule template. For example, if x is 1, and y is 0, it may indicate that the word is included in a rule template having a first identification number, and the word is located in the first location in the rule template.

For example, if an example rule template has the first identification number, [a message] is located in the third location in the example rule template, and thus the electronic apparatus 200 may index [a message] for the example rule template as (1,2). Then, the electronic apparatus 200 may index [send] as (1,3). A detailed description regarding performing indexing in a rule template will be described in greater detail below with reference to FIG. 3.

The indexing identification module 2000 may include various processing circuitry and/or executable program elements and identify indexed words among words included in the first text. The indexing identification module 2000 may identify the locations of the indexed words in the first text.

For example, the indexing identification module 2000 may identify [a message] and [send] for which indexing was performed in the example text "[(to) my eldest son] [call me] [(to)] [a message] [send])." The indexing identification module 2000 may identify that [a message] is located in the fourth location, and [send] is located in the fifth location in the example text.

When the indexed words in the first text are identified through the indexing identification module 2000, rule templates corresponding to a user's voice command may be identified through the rule template identification module 3000.

The rule template identification module 3000 may include various processing circuitry and/or executable program elements for identifying at least one rule template corresponding to a user's voice command among a plurality of prestored rule templates.

The rule template identification module 3000 may identify at least one first rule template which may include indexed words identified through the indexing identification module 2000, and which corresponds to the locations of the identified indexed words among a plurality of prestored rule templates.

For example, in the example text, [a message] and [send] are continuously located as the forth location and the fifth location, and in the example rule template, [a message] and [send] are also continuously located as the third location and the fourth location. Accordingly, the rule template identification module 3000 may identify the example rule template as a rule template which includes the indexed words included in the example text, and which corresponds to the locations of the indexed words. Other than the example rule template, the rule template identification module 3000 may identify at least one first rule template wherein [a message] and [send] are continuously located among the plurality of rule templates prestored in the rule template DB 10.

The rule template identification module 3000 may identify at least one second rule template of which slots are matched by at least one word excluding the indexed words among the plurality of words included in the first text in the identified at least one first rule template.

For example, the rule template identification module 3000 may identify whether the <SearchTerm> and <MessageText> slots in the example rule template "<SearchTerm> to <MessageText> send a message to" are matched by the words "[(to) my eldest son] [call me] [(to)]" excluding the indexed words in the example text "[(to) my eldest son] [call me] [(to)] [a message] [send])." As an example, to the <SearchTerm> slot, [(to) my eldest son] may be matched, and to the <MessageText> slot, [call me] [(to)] may be matched, and thus the rule template identification module 3000 may identify the example rule template as the second rule template. Other than the example rule template, the rule template identification module 3000 may identify at least one second template of which slots are matched by the words "[(to) my eldest son] [call me] [(to)]" among the plurality of rule templates prestored in the rule template DB 10.

When at least one second rule template is identified, the rank determination module 4000 may identify the priorities of the respective at least one second rule template, and identify a rule template according to the user's voice command.

The rank determination module 4000 may include various processing circuitry and/or executable program elements for identifying the priorities of the plurality of respective rule templates identified through the rule template identification module 3000. The electronic apparatus 200 may identify a rule template having the highest priority among the plurality of rule templates identified through the rule template identification module 3000 as a rule template corresponding to a user's voice command.

As an example, if a plurality of second rule templates are identified through the rule template identification module 3000, the rank determination module 4000 may identify at least one rule template having the biggest numbers of words and slots among the plurality of second rule templates as a 2-1 rule template having the highest priority.

In case the number of the identified 2-1 rule template is one, the rank determination module 4000 may identify the one 2-1 rule template as a rule template corresponding to a user's voice command.

In case the number of the identified 2-1 rule templates is a plural number, the rank determination module 4000 may identify the rule template of which number of slots is the smallest among the 2-1 rule templates as a 2-2 rule template. In case the number of the 2-2 rule template is one, the rank determination module 4000 may identify the one 2-2 rule template as a rule template corresponding to a user's command. An example in which there are a plurality of 2-2 rule templates will be described in greater detail below with reference to FIG. 5.

When a rule template corresponding to a user's voice command is identified through the rank determination module 4000, the electronic apparatus 200 may generate a control command corresponding to the rule template through the control command generation module 130.

The control command generation module 130 may include various processing circuitry and/or executable program elements for providing a control command corresponding to a voice command using a rule template corresponding to a user's voice command. For example, the control command generation module 130 may acquire a control command for a user command based on an intent and slots included in a rule template corresponding to a user's voice command identified through the natural language understanding module 120.

According to the disclosure, the plurality of respective rule templates prestored in the rule template DB 10 may include slots, and they may include an intent for performing a control command according to a rule template. The control command generation module 130 may acquire a control command based on an intent corresponding to a rule template corresponding to a voice command identified through the natural language understanding module 120 among the plurality of rule templates prestored in the rule template DB 10, and slots included in the rule template.

For example, if it is identified that a rule template corresponding to the example text "[(to) my eldest son] [call me] [(to)] [a message] [send])" is "<SearchTerm> to <MessageText> send a message to" through the natural language understanding module 120, the control command generation module 130 may identify that the rule template includes an intent of "sending a message," and a message is sent to a subject searched by the <SearchTerm> slot, and words included in the <MessageText> slot are a content of sending a message. That is, the control command generation module 130 may match the <SearchTerm> slot with "[(to) my eldest son]," and search the eldest son in the address list in the electronic apparatus 200, and match the <MessageText> slot with "[call me] [(to)]," and send a message to "call me" to the cell phone of the eldest son identified as a result of search.

In the aforementioned example, it was explained that a user's voice command is acquired, and a control command corresponding to the voice command is generated. However, the disclosure is not limited thereto, and the electronic apparatus 200 may directly acquire a text including a user command without going through the automatic speech recognition module 110, and generate a control command.

Figure 2:
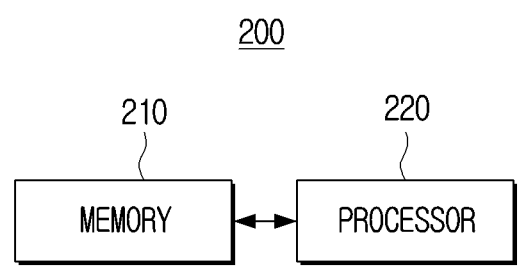
FIG. 2 is a block diagram illustrating an example configuration of an electronic apparatus according to various embodiments.

FIG. 2 is a block diagram illustrating an example configuration of an electronic apparatus according to various embodiments.

As illustrated in FIG. 2, the electronic apparatus 200 may include a memory 210 and a processor (e.g., including processing circuitry) 220. However, the components of the electronic apparatus 200 are not limited to the aforementioned components, and some components can obviously be added or omitted according to the type of the electronic apparatus.

The memory 210 may store at least one instruction or data related to at least one other component of the electronic apparatus 200. For example, the memory 210 may be implemented as a non-volatile memory, a volatile memory, a flash-memory, a hard disk drive (HDD) or a solid state drive (SSD), etc. Also, the memory 210 may be accessed by the processor 220, and reading/recording/correcting/deleting/updating, etc. of data by the processor 220 may be performed.

In the disclosure, the term memory may include a memory 210, a ROM (not shown), and a RAM (not shown) inside the processor 220, or a memory card (not shown) installed on the electronic apparatus 200 (e.g., a micro SD card, a memory stick). In the memory 210, programs or data, etc. for displaying various kinds of screens to be displayed in the display area of the display may be stored.

As described above, the memory 210 may store at least one instruction. An instruction may be for controlling the electronic apparatus 200. For example, in the memory 210, an instruction related to an application for implementing the command response system 100 may be stored.

The memory 210 may include a plurality of components of the command response system 100 as illustrated in FIG. 1. In particular, the memory 210 may include a rule template DB and an inverted index DB.

In addition, the memory 210 may store an artificial intelligence agent for providing a response to a user's command. For example, the electronic apparatus 200 may use an artificial intelligence agent for generating a control command and a response for a user's voice command. The artificial intelligence agent may refer, for example, to a dedicated program for providing artificial intelligence (AI)-based services (e.g., a voice recognition service, an agent service, a translation service, a search service, etc.). For example, the artificial intelligence agent may be executed by a conventional generic-purpose processor (e.g., a CPU) or a separate. AI-dedicated processor (e.g., a GPU, etc.). A detailed description regarding an artificial intelligence agent will be described in greater detail below with reference to FIG. 6.

The processor 220 may be electronically connected with the memory 210 and may include various processing circuitry to control the overall operations and functions of the electronic apparatus 200. The processor 220 may control the overall operations of the electronic apparatus 200. For this, the processor 220 may include, for example, and without limitation, one or more of a central processing unit (CPU), an application processor (AP), a communication processor (CP) a dedicated processor, or the like. The processor 220 may be implemented in various ways. For example, the processor 220 may be implemented, for example, and without limitation, as at least one of an application specific integrated circuit (ASIC), an embedded processor, a microprocessor, a hardware control logic, a hardware finite state machine (FSM), a digital signal processor (DSP), or the like. In the disclosure, the term processor 220 may include a central processing unit (CPU), a graphic processing unit (GPU), and a main processing unit (MPU), etc.

The processor 220 may control hardware or software components connected to the processor 220 by operating an operating system or an application program, and perform various kinds of data processing and operations. The processor 220 may load instructions or data received from at least one of other components on a volatile memory and process them, and store various data in a non-volatile memory.

The processor 220 may be electronically connected with the memory 210 and control the overall operations and functions of the electronic apparatus 200. For example, by executing at least one instruction stored in the memory 210, the processor 220 may provide the command response system 100 described above through FIG. 1. For example, the processor 220 may acquire a user voice command, perform voice recognition of the user voice command and acquire a first text, identify indexed words prestored in the memory among a plurality of words included in the first text, identify a rule template which includes the indexed words and includes slots matched to at least one word excluding the indexed words among the plurality of words among a plurality of rule templates prestored in the memory, and acquire a control command corresponding to the voice command based on the identified rule template.

As an example, the automatic speech recognition module 110, the natural language understanding module 120, and the control command generation module 130 in FIG. 1 may be included in the processor 220 in the electronic apparatus 200. The natural language understanding module 120 may be implemented through the sentence analysis module 1000, the indexing identification module 2000, the rule template identification module 3000, and the rank determination module 4000.

A plurality of modules for implementing the command response system 100 may be included in the electronic apparatus 200, but this is merely an example, and at least some of the modules for implementing the command response system 100 may be included in an external server.

The plurality of modules 110, 120 and 130 may respectively be implemented as software, but the disclosure is not limited thereto, and some of them may be implemented as a combination of hardware and software (e.g., various circuitry and exectable program elements). As another example, the plurality of modules may be implemented as one software.

As described above, the plurality of modules 110, 120.130 may be located in the processor 120, but the disclosure is not limited thereto, and the plurality of modules 110, 120 130 may be located in the memory 210. In case the plurality of modules 110, 120 130 are located in the memory 210, the processor 220 may load the plurality of modules 110, 120 130 from the non-volatile memory to the volatile memory, and execute each function of the plurality of modules 110, 120 130. Loading may refer, for example, to an operation of calling the data stored in the non-volatile memory to the volatile memory and storing the data, so that the processor 220 can access the data.

Figure 3:
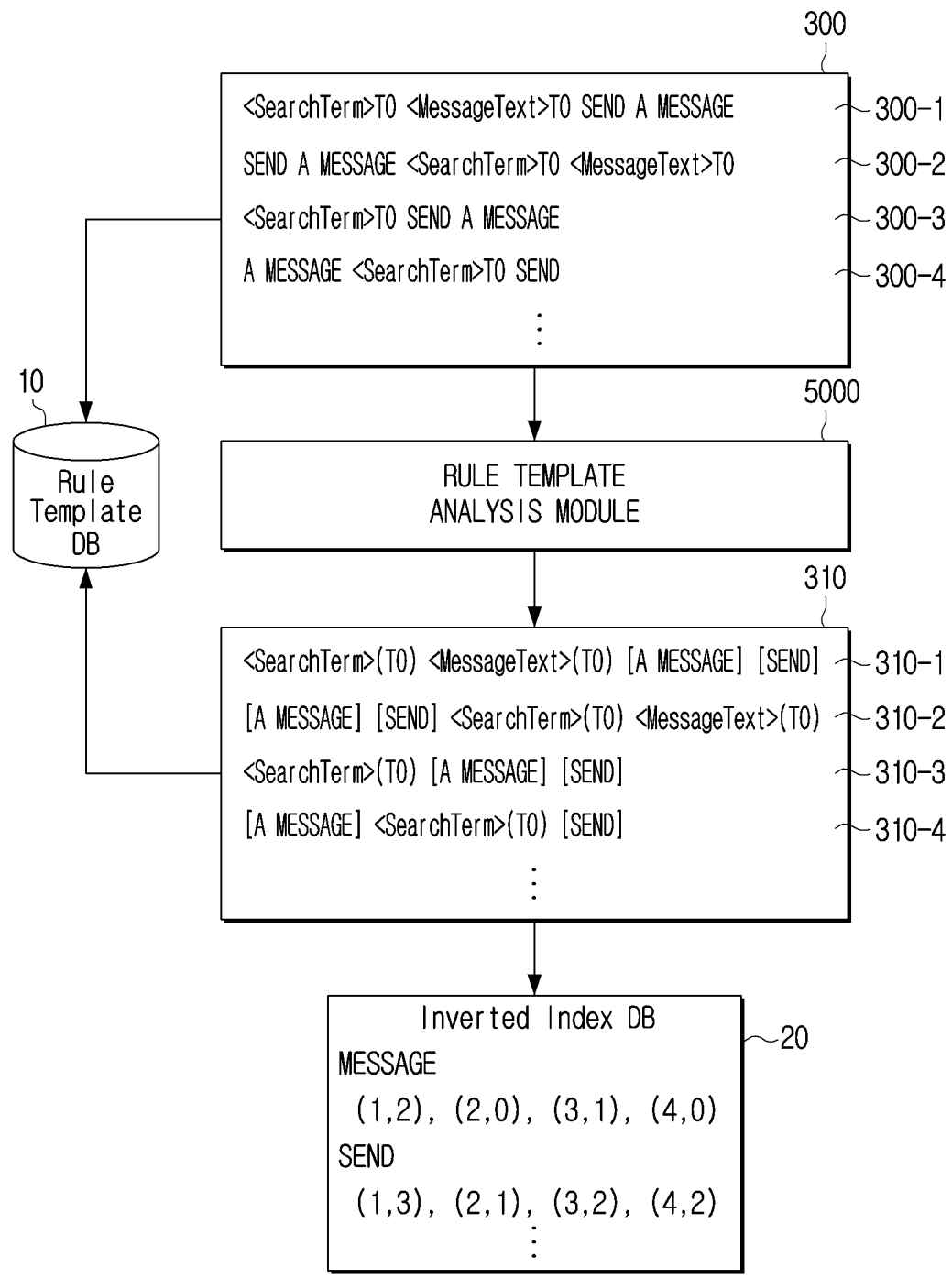
FIG. 3 is a diagram illustrating an example method of performing indexing for a rule template according to various embodiments.

FIG. 3 is a diagram illustrating an example method of performing indexing for a rule template according to various embodiments.

According to the disclosure, for the plurality of respective rule templates included in the rule template DB 10, indexing may be performed.

Referring to FIG. 3, the electronic apparatus 200 may identify slots included in the plurality of respective rule templates 300 prestored in the rule template DB 10 and words excluding the slots through a rule template analysis module 5000, and acquire a plurality of parsed rule templates 310. The electronic apparatus 200 may perform indexing for the plurality of parsed rule templates 310, and store the indexing information in the inverted index DB 20.

The rule template analysis module 5000 may include various processing circuitry and/or executable program elements for indexing, in the respective words excluding slots included in the rule templates, identification numbers of the rule templates including the words and the locations of the words in the rule templates.

In FIG. 3, it is illustrated that indexing of a 3-1 rule template 300-1 to a 3-4 rule template 300-4 is performed through the rule template analysis module 5000. In FIG. 3, only the 3-1 rule template 300-1 to the 3-4 rule template 300-4 are illustrated, but the disclosure is not limited thereto, and indexing may be performed for all rule templates included in the rule template DB 10.

The 3-1 rule template 300-1 may be a rule template having the first identification number, and the 3-2 rule template 300-2 may be a rule template having the second identification number. Also, the 3-3 rule template 300-3 and the 3-4 rule template 300-4 may be rule templates having the third identification number and the fourth identification number, and the identification numbers may be preset by a rule manager drafting rule templates.

For example, the rule template analysis module 5000 may identify slots, postpositions, and words excluding the slots for the respective rule templates included in the plurality of rule templates 300, and acquire a plurality of parsed rule templates 310. The rule template analysis module 5000 may store the plurality of parsed rule templates 310 in the rule template DB 10.

For example, the rule template analysis module 5000 may identify the open slots of <SearchTerm> and <MessageText> in the 3-1 rule template 300-1 which is "<SearchTerm> to <MessageText> send a message to," and identify (to) and (to) as postpositions. Then, the rule template analysis module 5000 may identify [a message] and [send] as words excluding the slots, and acquire a parsed 3-1 rule template 310-1 which is "<SearchTerm>(to)<MessageText>(to) [a message] [send]."

The electronic apparatus 200 may perform indexing such as (x,y) for the respective words excluding the slots in the plurality of parsed rule templates 310. In (x,y), x may refer, for example, to an identification number of a rule template, and y may refer, for example, to the location of the word in the rule template. For example, if x is 1, and y is 0, it may indicate that the word is located in the first location in the example rule template.

For example, the parsed 3-1 rule template 310-1 has the first identification number, and [a message] and [send] are respectively located in the third location and the fourth location based on the word segments in the parsed 3-1 rule template 310-1. Accordingly, the electronic apparatus 200 may index [a message] in the parsed 3-1 rule template 310-1 as (1,2), and [send] as (1,3).

The parsed 3-2 rule template 310-2 has the second identification number, and [a message] and [send] are respectively located in the first location and the second location based on the word segments in the parsed 3-2 rule template 310-2. Accordingly, the electronic apparatus 200 may index [a message] in the parsed 3-2 rule template 310-2 as (2,0), and [send] as (2,1).

The parsed 3-3 rule template 310-3 has the third identification number, and [a message] and [send] are respectively located in the second location and the third location based on the word segments in the parsed 3-3 rule template 310-3. Accordingly, the electronic apparatus 200 may index [a message] in the parsed 3-3 rule template 310-3 as (3,1), and [send] as (3,2).

The parsed 3-4 rule template 310-4 has the fourth identification number, and [a message] and [send] are respectively located in the first location and the third location based on the word segments in the parsed 3-4 rule template 310-4. Accordingly, the electronic apparatus 200 may index [a message] in the parsed 3-4 rule template 310-4 as (4,0), and [send] as (4,2).

The electronic apparatus 200 may store the indexed information in the plurality of parsed rule templates 310 in the inverted index DB 20.

When a user voice command is acquired, the electronic apparatus 200 may identify the words indexed through the process in FIG. 3 in the user voice command through the inverted index DB 20. Then, the electronic apparatus 200 may identify a rule template which includes the indexed words included in the user voice command, and includes slots matched to at least one word excluding the indexed words among the plurality of words included in the user voice command in the rule template DB 10. A detailed description in this regard will be provided in greater detail below with reference to FIG. 4A and FIG. 4B.

Figure 4A:
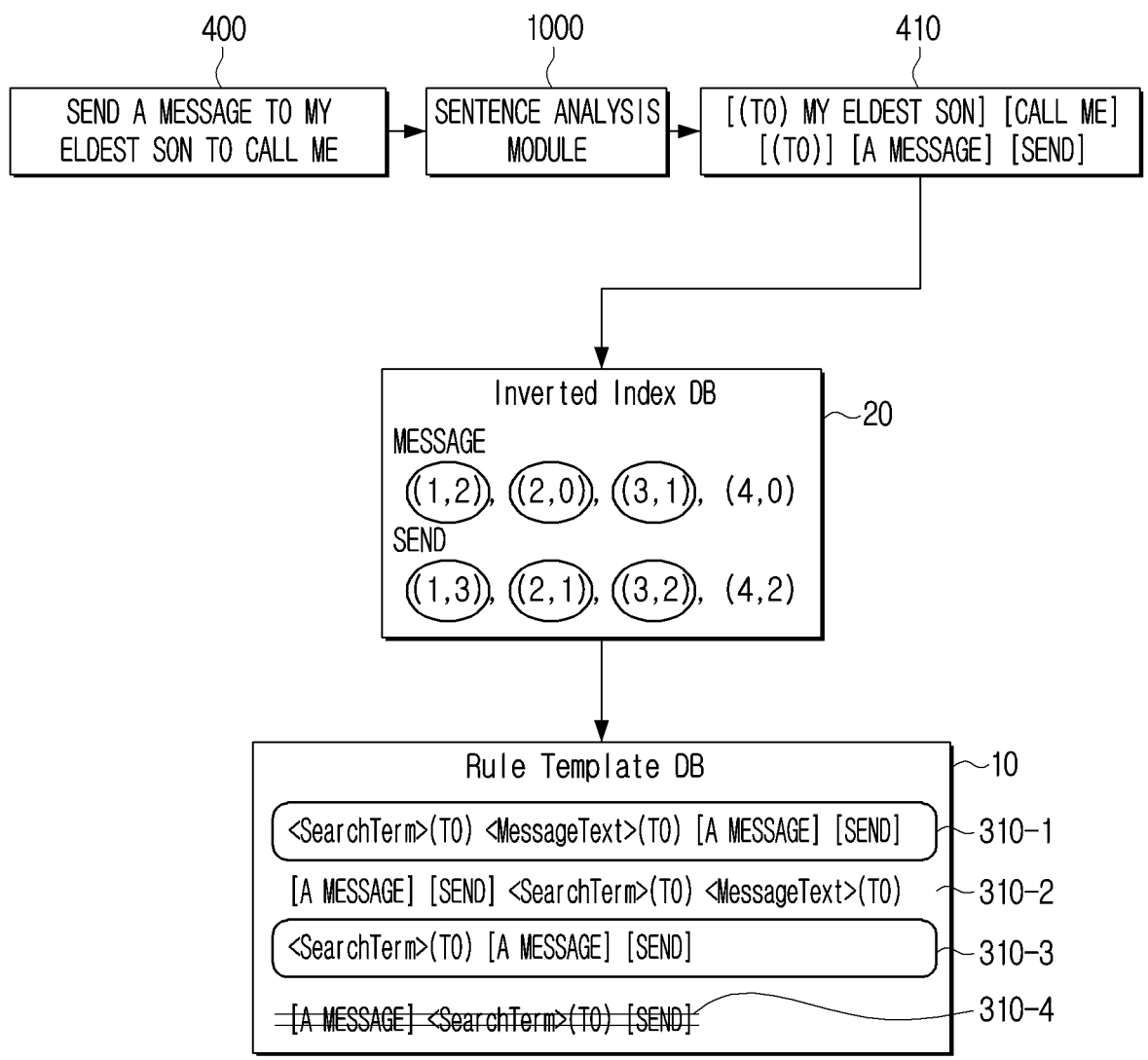
FIG. 4A is a diagram illustrating an example method of identifying a rule template corresponding to a user's voice command according to various embodiments.

FIG. 4A is a diagram illustrating an example method of identifying a rule template corresponding to a user's voice command according to various embodiments.

According to the disclosure, if a user's voice command is received, the electronic apparatus 200 may acquire text data 400 corresponding to the user's voice command. For example, the electronic apparatus 200 may convert a user's voice command into text data 400 through the automatic speech recognition (ASR) module 110.

The sentence analysis module 1000 may convert the text data 400 into a first text 410. For example, the sentence analysis module 1000 may analyze the text data 400 which is "Send a message to my eldest son to call me," and identify an example text including five words like "[(to) my eldest son] [call me] [(to)] [a message] [send])."

As an example, the sentence analysis module 1000 may acquire a word which is a generalized form of a verb included in the first text 410. For example, the sentence analysis module 1000 may generalize the verb "send" included in "Send a message to my eldest son to call me" and acquire a word "send."

As an example, the sentence analysis module 1000 may identify a postposition included in a user's voice command and extend the postposition. That is, the sentence analysis module 1000 may extend the postposition "to" included in "to my eldest son" included in "Send a message to my eldest son to call me" to "for," "toward," etc., and store the phrase as [to my eldest son], [toward my eldest son], and [for my eldest son]. Also, the sentence analysis module 1000 may extend the postposition "to" included in "to" to "for," etc., and store the phrase to [to] and [for].

The electronic apparatus 200 may identify indexed words in the first text 410, and identify the locations of the indexed words in the first text 410. As described in FIG. 3, indexing was previously performed for [a message] and [send], and thus the electronic apparatus 200 may identify the words [a message] and [send] as the indexed words. Then, the electronic apparatus 200 may identify that [a message] is located in the fourth location, and [send] is located in the fifth location in the first text 410.

The electronic apparatus 200 may identify rule templates which include the indexed words, and which are matched to the locations of the indexed words through the inverted index DB 20. In the inverted index DB 20 in FIG. 4A, all the rule templates having the first to fourth identification numbers include the words [a message] and [send], but in the parsed rule template having the fourth identification number 310-4, the words [a message] and [send] are not continuously located. Accordingly, the electronic apparatus 200 may identify the parsed rule templates having the first to third identification numbers 310-1 to 310-3 as rule templates which include the indexed words, and which are matched to the locations of the indexed words.

The electronic apparatus 200 may identify whether the slots in the rule templates 310-1 to 310-3 identified through the inverted index DB 20 are matched to at least one word excluding the indexed words among the plurality of words included in the first text in the rule template DB 10.

For example, the electronic apparatus 200 may identify whether the slots in the rule templates having the first to third identification numbers 310-1 to 310-3 are matched through the words [(to) my eldest son], [call me], and [(to)] excluding the indexed words among the plurality of words included in the first text.

In the parsed 3-1 rule template 310-1, the <SearchTerm> and <MessageText> slots are located in front of the indexed word [a message]. Thus, [(to) my eldest son], [call me], and [(to)] may be matched to the <SearchTerm> and <MessageText> slots.

In the parsed 3-3 rule template 310-3, the <SearchTerm> slot is located in front of [a message]. Thus, [(to) my eldest son], [call me], and [(to)] may be matched to the <SearchTerm> slot.

In the parsed 3-2 rule template 310-2, the <SearchTerm> and <MessageText> slots are located behind the indexed word [send]. Thus, the words [(to) my eldest son], [call me], and [(to)] may not be matched by the slots of the parsed 3-2 rule template 310-2.

Accordingly, the electronic apparatus 200 may identify the 3-1 rule template 300-1 and the 3-3 rule template 300-3 corresponding to the parsed 3-1 rule template 310-1 and the parsed 3-3 rule template 310-3 as rule templates corresponding to the user's voice command.

Figure 4B:
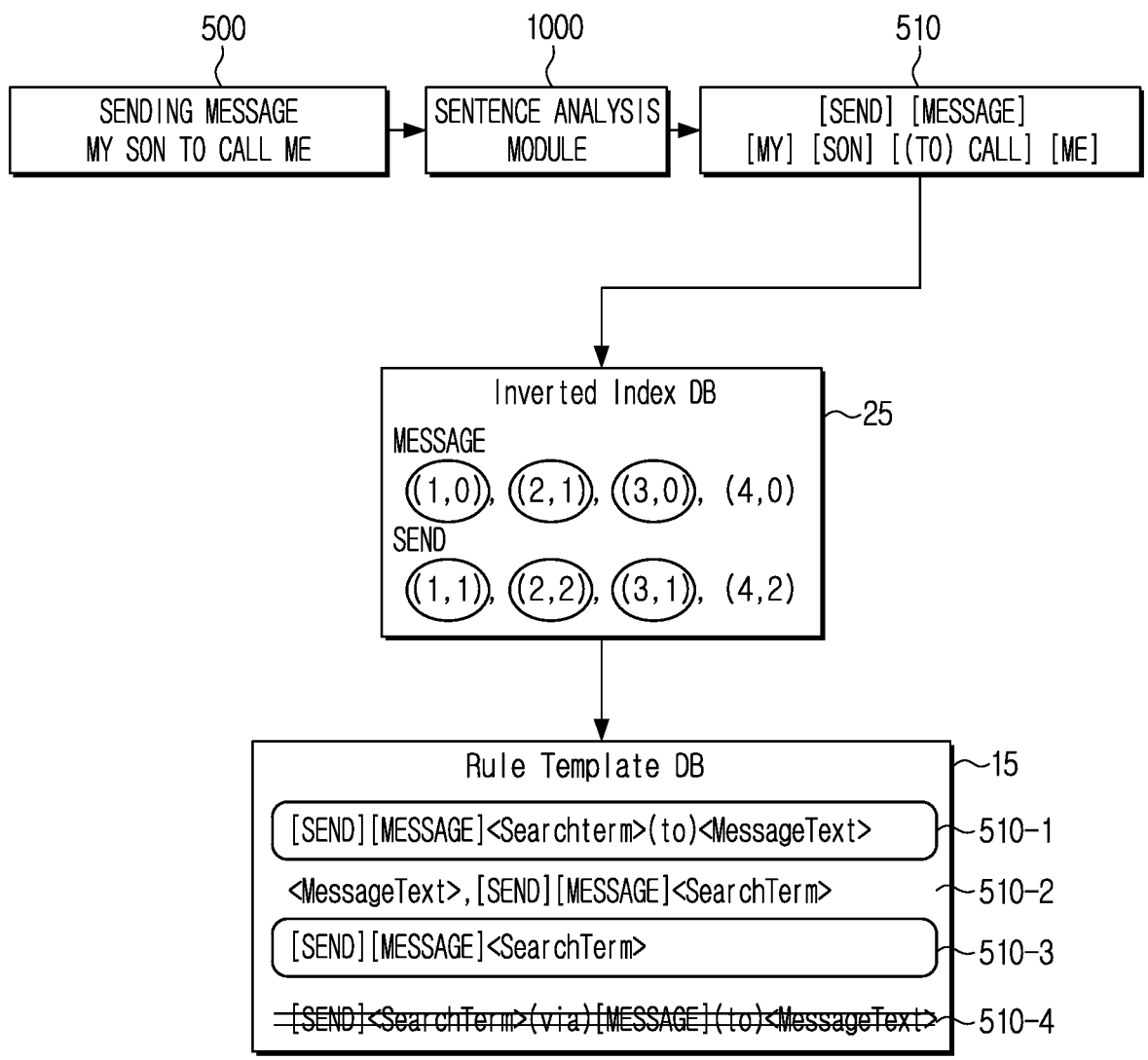
FIG. 4B is a diagram illustrating an example in which a user's voice command is English according to various embodiments.

FIG. 4B is a diagram illustrating an example in which a user's voice command is English according to various embodiments.

According to the disclosure, if a user's English voice command is received, the electronic apparatus 200 may acquire English text data 500 corresponding to the user's voice command. For example, the electronic apparatus 200 may convert the user's voice command into English text data 500 through the automatic speech recognition (ASR) module 110.

Then, the sentence analysis module 1000 may convert the English text data 500 into a first text 510. For example, the sentence analysis module 1000 may analyze the English text data 500 which is "SENDING MESSAGE MY SON TO CALL ME," and identify an example text including six words like "[SEND] [MESSAGE] [MY] [SON] [(TO) CALL] [ME]."

As an example, the sentence analysis module 1000 may acquire a word which is a generalized form of the verb included in the first text 510. That is, the sentence analysis module 1000 may generalize "SENDING" included in "SENDING MESSAGE MY SON TO CALL ME" and acquire the word "SEND."

As an example, the sentence analysis module 1000 may identify a postposition included in a user's voice command and extend or omit the postposition. That is, the sentence analysis module 1000 may extend "TO" included in "TO CALL" included in "SENDING MESSAGE MY SON TO CALL ME" to "FOR," or omit the postposition, and store the phrase as [TO CALL], [FOR CALL], and [CALL].

The electronic apparatus 200 may identify the indexed words in the first text 510, and identify the locations of the indexed words in the first text 510. As an example, in case indexing was previously performed for [MESSAGE] and [SEND], the electronic apparatus 200 may identify the words [MESSAGE] and [SEND] as indexed words in the first text 510. The electronic apparatus 200 may identify that [SEND] is located in the first location, and [MESSAGE] is located in the second location in the first text 510.

Through the inverted index DB 25, the electronic apparatus 200 may identify rule templates which include the indexed words, and which are matched to the locations of the indexed words. As an example, the inverted index DB 20 in FIG. 4A may include information on indexing performed for Korean words, and the inverted index DB 25 in FIG. 4B may include information on indexing performed for English words. However, the disclosure is not limited thereto, and in one inverted index DB, information on indexing performed for various languages may be stored.

In the inverted index DB 25 of FIG. 4B, all rule templates having the first to fourth identification numbers include the words [MESSAGE] and [SEND], but in the parsed rule template 510-4 having the fourth identification number, the words [MESSAGE] and [SEND] are not continuously located as in the example text. Thus, the electronic apparatus 200 may identify the parsed rule templates 510-1 to 510-3 having the first to third identification numbers as rule templates which include the indexed words, and which are matched to the locations of the indexed words.

The electronic apparatus 200 may identify whether the slots in the rule templates 510-1 to 510-3 identified through the inverted index DB 25 in the rule template DB 15 are matched to at least one word excluding the indexed words among the plurality of words included in the first text. As an example, in the rule template DB 10 in FIG. 3 and FIG. 4A, Korean rule templates may be stored, and in the rule template DB 15 in FIG. 4B, English rule templates may be stored. However, the disclosure is not limited thereto, and in one rule template DB, rule templates in various languages may be stored.

Through the words [MY] [SON] [(TO) CALL] [ME] excluding the indexed words among the plurality of words included in the first text, the electronic apparatus 200 may identify whether the slots in the rule templates 510-1 to 510-3 having the first to third identification numbers are matched.

In the parsed rule template 510-1 having the first identification number, the <SearchTerm> and <MessageText> slots are located behind the indexed word [MESSAGE], and thus the words [MY] [SON] [(TO) CALL] [ME] may be matched to the <SearchTerm> and <MessageText> slots.

In the parsed rule template 510-3 having the third identification number, the <SearchTerm> slot is located in front of [MESSAGE], and thus the words [MY] [SON] [(TO) CALL] [ME] may be matched to the <SearchTerm> slot.

In the parsed rule template 510-2 having the second identification number, the <SearchTerm> slot is located behind [MESSAGE], but the <MessageText> slot is located in front of [SEND], and thus the words [MY] [SON] [(TO) CALL] [ME] may be matched by the <SearchTerm> slot in the parsed rule template 510-2 having the second identification number, but the words may not be matched by the <MessageText> slot.

Accordingly, the electronic apparatus 200 may identify rule templates corresponding to the parsed rule template 510-1 having the first identification number and the parsed rule template 510-3 having the third identification number as rule templates corresponding to the user's voice command.

In FIG. 3, FIG. 4A, and FIG. 4B, it is illustrated that the slots in the rule templates are only open slots, but the disclosure is not limited thereto, and the rule templates may include close slots. For example, in case rule templates corresponding to a user's voice command include close slots, words of the type corresponding to the close slots may be included in the first text. In case rule templates corresponding to a user's voice command include open slots, the open slots may be matched through words excluding the indexed words in the first text.

According to the disclosure, as in FIG. 4A and FIG. 4B, a plurality of rule templates corresponding to a user's voice command may be identified. In this case, the priorities of the plurality of respective identified rule templates may be identified, and a rule template having the highest priority may be identified as the final rule template. A method for identifying priorities will be described in greater detail below with reference to FIG. 5.

Figure 5:
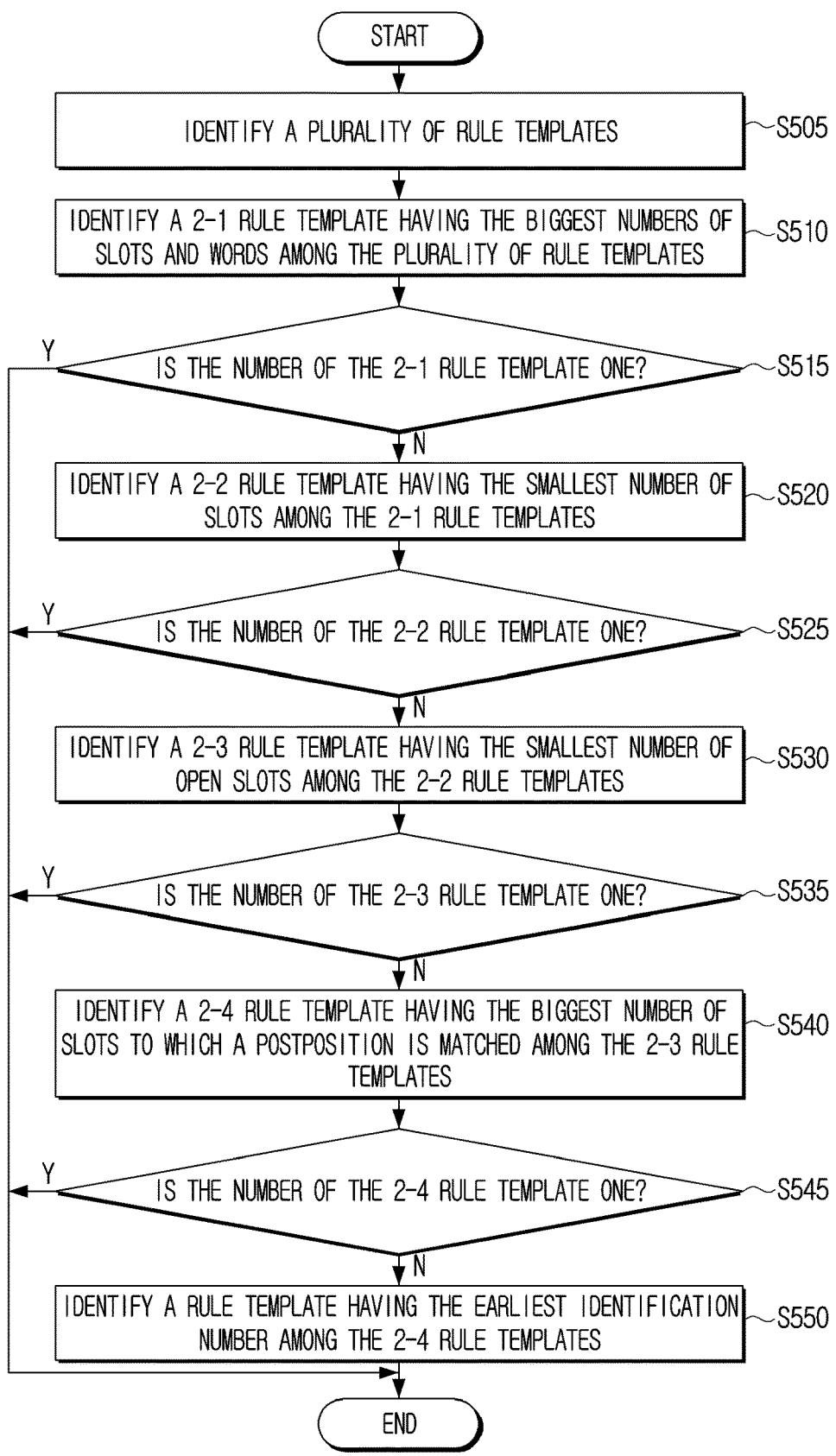
FIG. 5 is a flowchart illustrating an example operation of determining ranks according to various embodiments.

FIG. 5 is a flowchart illustrating an example operation of determining ranks according to various embodiments.

The electronic apparatus 200 may identify a plurality of rule templates through the rule template identification module 3000 in operation S505. For example, through the rule template identification module 3000, the electronic apparatus 200 may identify a plurality of rule templates which include indexed words included in a user's voice command, and which include slots matched by at least one word excluding the indexed words among a plurality of words included in the user's voice command among the rule templates prestored in the rule template DB 10. For example, as described above in FIG. 1, the electronic apparatus 200 may identify a plurality of second rule templates through the rule template identification module 3000.

When the plurality of rule templates are identified, the electronic apparatus 200 may identify a 2-1 rule template having the biggest (e.g., largest) numbers of slots and words among the plurality of rule templates in operation S510. For example, a rule template having bigger (e.g., larger) numbers of slots and words among the plurality of rule templates may be a rule template reflecting an intent for the user's voice command more correctly.

In case the number of the identified 2-1 rule template is one in operation S515-Y, the electronic apparatus 200 may identify the one 2-1 rule template as the final rule template. Taking the case of FIG. 4A as an example, between the 3-1 rule template 300-1 and the 3-3 rule template 300-3 identified as rule templates corresponding to a user's voice command, the numbers of slots and words of the 3-1 rule template 300-1 are bigger than those of the 3-3 rule template 300-3, and thus the electronic apparatus 200 may identify the 3-1 rule template as the final rule template.

In case the number of the plurality of identified 2-1 rule templates is not one in operation S515-N, the electronic apparatus 200 may identify a 2-2 rule template having the smallest (e.g., lowest) number of slots among the plurality of 2-1 rule templates in operation S520. For example, the plurality of respective 2-1 rule templates have the same summed-up number of slots and words, and as the number of slots is smaller (e.g., lower) in the summed-up number, it indicates that the number of words is bigger. Also, among the plurality of rule templates having the same summed-up number of slots and words, a rule template having a bigger number of words may be a rule template reflecting an intent for the user's voice command more correctly.

In case the number of the identified 2-2 rule template is one in operation S525-Y, the electronic apparatus 200 may identify the one 2-2 rule template as the final rule template.

In case the number of the plurality of identified 2-2 rule templates is not one in operation S525-N, the electronic apparatus 200 may identify a 2-3 rule template having the smallest number of open slots among the plurality of 2-2 rule templates in operation S530. For example, the plurality of 2-2 rule templates are rule templates that have the same summed-up number of slots and words, and have the same number of slots, and as the number of open slots is smaller in the number of slots, it may mean that the number of close slots is bigger. Accordingly, among the plurality of 2-2 rule templates, a rule template having a bigger number of close slots may be a rule template reflecting an intent for the user's voice command more correctly.

In case the number of the identified 2-3 rule template is one in operation S535-Y, the electronic apparatus 200 may identify the one 2-3 rule template as the final rule template.

In case the number of the plurality of identified 2-3 rule templates is not one in operation S535-N, the electronic apparatus 200 may identify a 2-4 rule template having the biggest number of slots to which a postposition is matched among the plurality of 2-3 rule templates in operation S540. For example, among the plurality of 2-3 rule templates, a rule template having a bigger number of slots to which a postposition is matched may be a rule template reflecting an intent for the user's voice command more correctly.

In case the number of the identified 2-4 rule template is one in operation S545-Y, the electronic apparatus 200 may identify the one 2-4 rule template as the final rule template.

In case the number of the plurality of identified 2-4 rule templates is not one in operation S545-N, the electronic apparatus 200 may identify a rule template having the earliest identification number among the plurality of 2-4 rule templates as the final rule template. For example, to a rule template having an earlier identification number of a rule template preset by a rule manager who drafts rule templates, the higher priority may have been designated by the rule manager.

Figure 6:
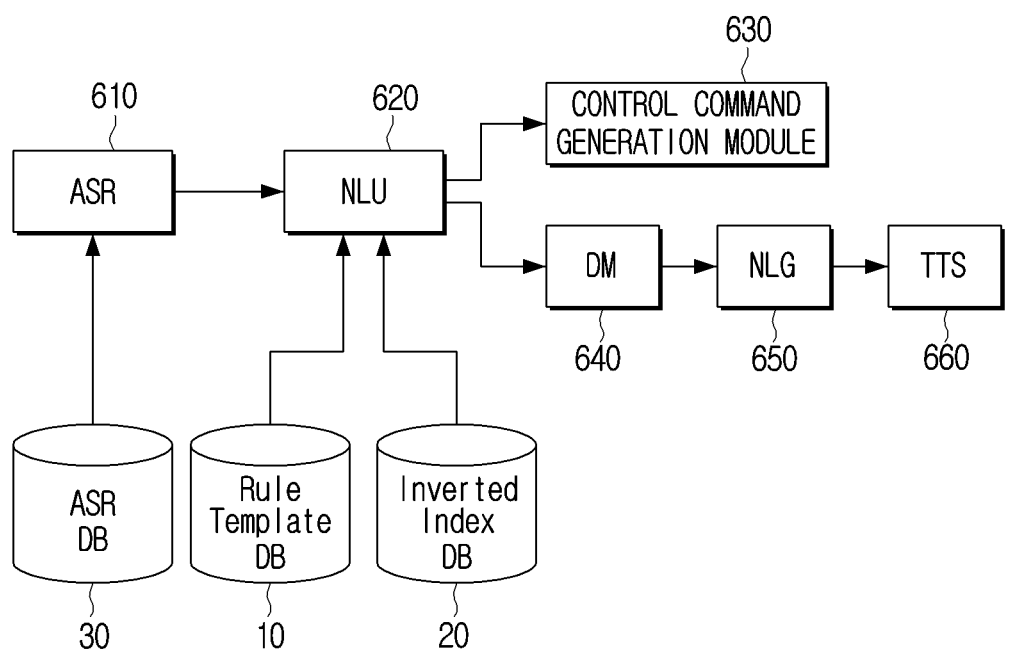
FIG. 6 is a block diagram illustrating example components for providing a control command and a response for a user's voice command according to various embodiments.

FIG. 6 is a block diagram illustrating example components for providing a control command and a response for a user's voice command according to various embodiments.

According to the disclosure, the electronic apparatus 200 may acquire a control command according to a user's voice command, and perform an operation corresponding to the control command. As a method for acquiring a control command, e.g., the ASR module 610, the natural language understanding module 620, and the control command generation module 630 were described above through FIG. 1, overlapping explanation may not be repeated here.

The electronic apparatus 200 may provide a dialogue system which performs an operation corresponding to a control command, and which provides a response to a user's voice command. For example, a dialogue manager DM (e.g., including various processing circuitry and/or executable program elements) 640 may acquire information on a response for a user's voice command based on a rule template acquired by the natural language understanding module 620. The dialogue manager 640 may provide a response for the user voice command based on a knowledge DB. The knowledge DB may be included in the electronic apparatus 200, but this is merely an embodiment, and the knowledge DB may be included in an external server.

When the information on a response for the user voice command is acquired, a natural language generation (NLG) module (e.g., including various processing circuitry and/or executable program elements) 650 may change the response information acquired through the dialogue manager 640 to the form of a text. The information changed to the form of a text may be in the form of a natural language utterance. The response information may be, for example, information guiding completion of an operation corresponding to the user voice command. The information changed to the form of a text may be displayed on the display of the electronic apparatus 200, or it may be changed to the form of a voice by a text-to-speech (TTS) module (e.g., including various processing circuitry and/or executable program elements) 660.

The TTS module 660 may change the information in the form of a text to information in the form of a voice. The TTS module 660 may include a plurality of TTS models for generating responses in various voices, and the TTS module 660 may acquire a response voice in the form of a voice using a TTS model corresponding to a user among the plurality of TTS models. For example, if it is determined that a user is a child, the TTS module 660 may acquire a response voice using a TTS model corresponding to a child (e.g., a TTS model for generating a voice of an animation character that children like).

For example, if a user's voice command which is "Send a message to my eldest son to call me" is acquired, the natural language understanding module 620 may identify a rule template which is "<SearchTerm> to <MessageText> send a message to" as a rule template corresponding to the user's voice command, according to an embodiment of the disclosure. The control command generation module 630 may acquire a control command based on the identified rule template, and the electronic apparatus 200 may perform an operation corresponding to the control command.

The dialogue manager 640 may generate information that "A message asking to call was sent to your eldest son" as information guiding completion of the operation corresponding to the user voice command, and provide the information in the form of a text by the natural language generation (NLG) module 650, or provide the information in the form of a voice through the TTS module 660.

As an example, before the electronic apparatus 200 performs an operation corresponding to a control command, the dialogue manager 640 may generate information asking whether to perform the control command and provide the information. For example, the dialogue manager 640 may generate information which is "Do you want me to send a message asking to call to your eldest son?" and provide the information in the form of a text through the natural language generation (NLG) module 650, or provide the information in the form of a voice through the TTS module 660, and according to a user voice command in response thereto, the electronic apparatus 200 may perform an operation corresponding to the control command.

As an example, in case a rule template corresponding to a user's voice command was not identified through the natural language understanding module 620, the dialogue manager 640 may generate information asking for an additional input. That is, the dialogue manager 640 may generate information such as "Please repeat that" and "I didn't understand," and provide the information in the form of a text by the natural language generation (NLG) module 650, or provide the information in the form of a voice through the TTS module 660.

As an example, in case a rule template corresponding to a user's voice command was identified through the natural language understanding module 620, but it is not perfect for performing an operation according to the rule template, the dialogue manager 640 may generate information asking for an additional input.

For example, if a rule template corresponding to a user's voice command which is "Send a message to my eldest son to call me" is identified as "<SearchTerm> to send a message" through the natural language understanding module 620, the dialogue manager 640 may generate information such as "What kind of message do you want me to send to your eldest son?" and provide the information in the form of a text by the natural language generation (NLG) module 650, or provide the information in the form of a voice through the TTS module 660. Then, when the user's additional input is acquired, the electronic apparatus 200 may send a text corresponding to the additional input as a message to the subject identified through the <SearchTerm>.

Figure 7:
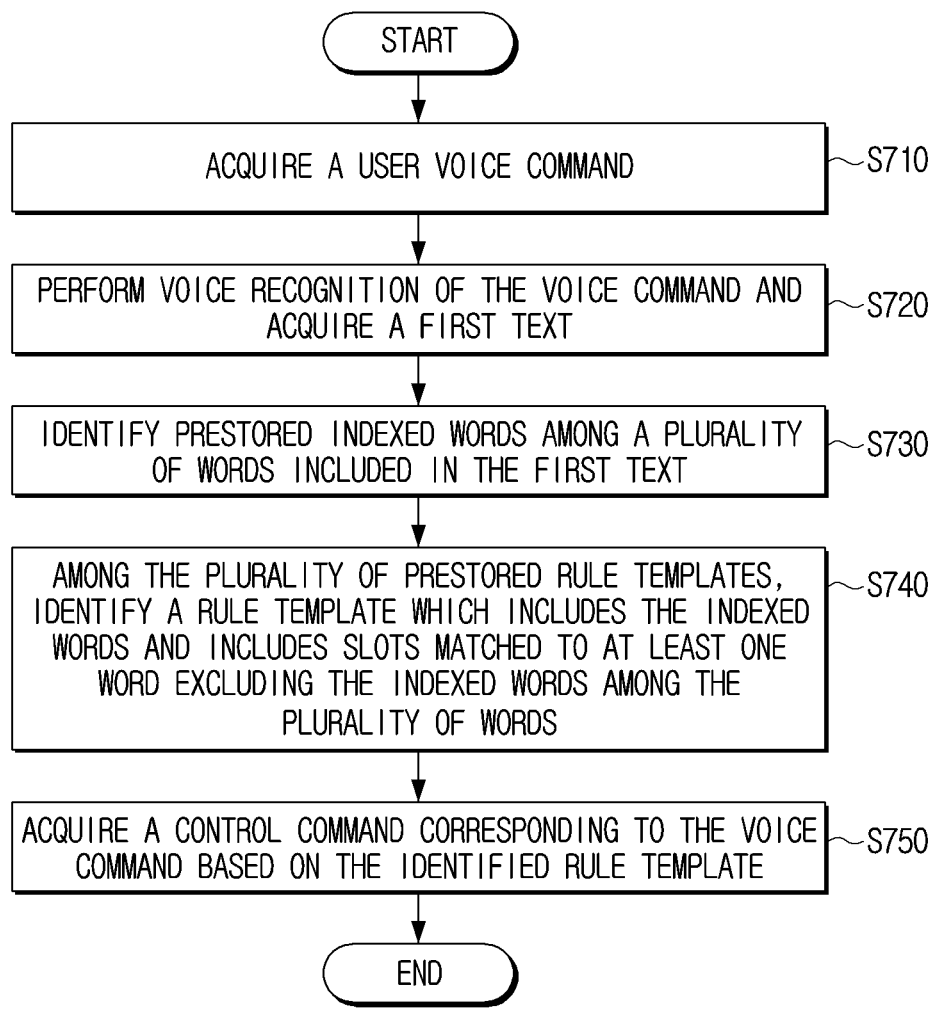
FIG. 7 is a flowchart illustrating an example method for controlling an electronic apparatus according to various embodiments.

FIG. 7 is a flowchart illustrating an example method for controlling an electronic apparatus according to various embodiments.

The electronic apparatus 200 may acquire a user voice command in operation S710. As an example, the electronic apparatus 200 may acquire a user voice command through a microphone provided on the electronic apparatus 200.

The electronic apparatus 200 may perform voice recognition of the voice command and acquire a first text in operation S720. As an example, the electronic apparatus 200 may acquire a first text by converting the voice command into text data through the ASR module, and converting the converted text data into a first text through the sentence analysis module.

The electronic apparatus 200 may identify prestored indexed words among a plurality of words included in the first text. For example, in the respective words excluding the slots in the plurality of rule templates stored in the rule template DB 10, identification numbers of rule templates including the words and the locations of the words in the rule templates may be indexed. Then, the electronic apparatus 200 may identify words for which indexing was performed in the first text, and identify the locations of the identified words in the first text.

The electronic apparatus 200 may identify, among the plurality of prestored rule templates, a rule template which includes the indexed words and includes slots matched to at least one word excluding the indexed words among the plurality of words in operation S740. For example, the electronic apparatus 200 may identify at least one first rule template which includes the indexed words, and which corresponds to the locations of the indexed words among the plurality of rule templates prestored in the rule template DB 10, and identify at least one second rule template of which slots are matched by the at least one word excluding the indexed words among the plurality of words included in the first text in the identified at least one first rule template.

As an example, if it is identified that there are a plurality of second rule templates, the electronic apparatus 200 may identify the priorities of the plurality of respective second rule templates, and identify a final rule template corresponding to a voice command based on the identified priorities. For example, the electronic apparatus 200 may identify a rule template having the biggest numbers of texts and slots among the plurality of second rule templates as a rule template corresponding to a user voice command.

In case there is one rule template having the biggest numbers of texts and slots, the electronic apparatus 200 may identify the rule template as the final rule template.

In case there are a plurality of rule templates having the biggest numbers of texts and slots, the electronic apparatus 200 may identify a rule template having the smallest number of slots among the rule templates as a rule template corresponding to the user voice command. In case there is one rule template having the smallest number of slots, the electronic apparatus 200 may identify the rule template as the final rule template.

The electronic apparatus 200 may acquire a control command corresponding to the voice command based on the identified rule template in operation S750.

Figure 8:
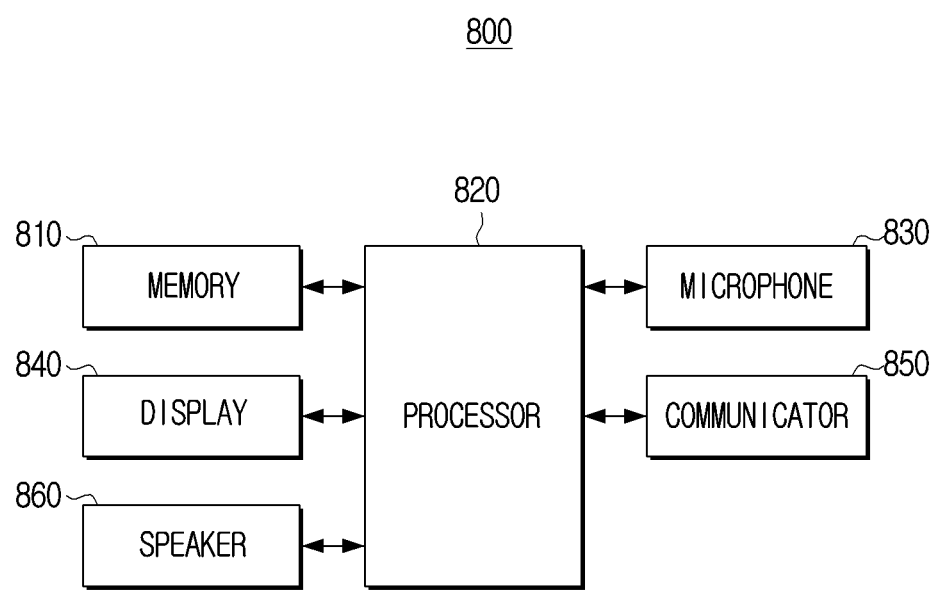
FIG. 8 is a block diagram illustrating an example configuration of an electronic apparatus according to various embodiments.

FIG. 8 is a block diagram illustrating an example configuration of an electronic apparatus according to various embodiments. Referring to FIG. 8, the electronic apparatus 800 may include a memory 810, a processor (e.g., including processing circuitry) 820, a microphone 830, a display 840, a communicator (e.g., including communication circuitry) 850, and a speaker 860. As the memory 810 and the processor 820 illustrated in FIG. 8 overlap with the memory 210 and the processor 220 illustrated in FIG. 2, overlapping explanation may not be repeated here. Also, depending on implementation examples of the electronic apparatus 800, some of the components in FIG. 8 may be removed, or other components can be added.

The microphone 830 may receive an input of an audio signal including a user voice command. The microphone 830 may receive an audio signal including a user voice command for making the electronic apparatus 800 perform a specific control command. A plurality of microphones 830 may be provided on the main body of the electronic apparatus 800, but this is merely an embodiment, and the microphone 830 may be located outside and may be electronically connected with the electronic apparatus 800.

The display 840 may refer to a component for the electronic apparatus 800 to visually provide information. The electronic apparatus 800 may include at least one display 840, and may display a response for an input user voice command, an inquiry regarding a user voice command, notification information, etc. through the display 840. The display 840 may be implemented, for example, and without limitation, as a liquid crystal display (LCD), a plasma display panel (PDP), organic light emitting diodes (OLED), transparent OLED (TOLED), micro LED, etc. Also, the display 840 may be implemented in the form of a touch screen that can detect a user's touch operation, and it may also be implemented as a flexible display that can be folded or bent.

For example, the display 840 may visually provide a response for a user voice command.

The communicator 850 may include various communication circuitry that can perform communication with an external device. Connection of communication of the communicator 850 with an external device may include communication via a third device (e.g., a repeater, a hub, an access point, a server, or a gateway, etc.). Wireless communication may include, for example, cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). Wired communication may include, for example, at least one of a universal serial bus (USB), a high definition multimedia interface (HDMI), a recommended standard 232 (RS-232), power line communication, or a plain old telephone service (POTS). Networks wherein wireless communication or wired communication is performed may include a telecommunication network, for example, at least one of a computer network (e.g.: an LAN or a WAN), the Internet, or a telephone network.

For example, the communicator 850 may perform communication with an external server and provide a command response system and a dialogue system services.

The speaker 860 may refer to a component for the electronic apparatus 800 to acoustically provide information. The electronic apparatus 800 may include at least one speaker 860, and output a response for an input user voice command, an inquiry regarding a user voice command, notification information, etc. as an audio signal through the speaker 860. A component for outputting an audio signal may be implemented as the speaker 860, but this is merely an embodiment, and the component can obviously be implemented as an output terminal.

Various modifications may be made to the embodiments of the disclosure, and there may be various types of embodiments. Accordingly, various example embodiments were illustrated in drawings, and the embodiments were described in detail in the detailed description. However, it should be noted that the various example embodiments are not for limiting the scope of the disclosure to a specific embodiment, but they should be interpreted to include various modifications, equivalents, and/or alternatives of the embodiments of the disclosure. With respect to the detailed description of the drawings, similar components may be designated by similar reference numerals.

In describing the disclosure, in case it was determined that detailed explanation of related known functions or features may unnecessarily confuse the gist of the disclosure, the detailed explanation may have been omitted.

In addition, the embodiments described above may be modified in various different forms, and the scope of the technical idea of the disclosure is not limited to the embodiments above. Rather, these embodiments were provided to make the disclosure more sufficient and complete, and to fully convey the technical idea of the disclosure to those skilled in the art.

The terms used in the disclosure were used simply to explain various embodiments, and were not intended to limit the scope of the disclosure. Further, singular expressions include plural expressions, unless defined obviously differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second" and the like used in the disclosure may describe various elements regardless of any order and/or degree of importance. Such expressions may be used to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

The description that one element (e.g.: a first element) is "directly coupled" or "directly connected" to another element (e.g.: a second element) can be interpreted to mean that still another element (e.g.: a third element) does not exist between the one element and the another element.

The expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily refer to a device that is "specifically designed to" in terms of hardware.

Instead, under some circumstances, the expression "a device configured to" may refer, for example, to the device being "capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, 'a module' or 'a unit' may perform at least one function or operation, and may be implemented as hardware or software, or as a combination of hardware and software. Also, a plurality of 'modules' or 'units' may be integrated into at least one module and implemented as at least one processor, excluding 'a module' or 'a unit' that needs to be implemented as specific hardware.

Various elements and areas in the drawings are illustrated schematically. Accordingly, the technical idea of the disclosure is not limited by the relative sizes or intervals illustrated in the accompanying drawings.

The aforementioned various embodiments of the disclosure may be implemented in a recording medium that can be read by a computer or a device similar to a computer using software, hardware or a combination thereof. According to implementation by hardware, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In some cases, the embodiments described in this specification may be implemented as the processor itself. According to implementation by software, the embodiments such as procedures and functions described in this specification may be implemented as separate software modules. Each of the software modules may perform one or more functions and operations described in this specification.

The methods according to the aforementioned various embodiments of the disclosure may be stored in a non-transitory readable medium. Such a non-transitory readable medium may be used while being installed on various devices.

A non-transitory readable medium may refer, for example, to a medium that stores data semi-permanently, and is readable by machines. For example, programs for executing the aforementioned various methods may be provided while being stored in a non-transitory readable medium such as a CD, a DVD, a hard disk, a blue-ray disk, a USB, a memory card, a ROM and the like.

The methods according to the various embodiments described in the disclosure may be provided while being included in a computer program product. The computer program product can be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

While the disclosure has been illustrated and described with reference to various example embodiments, it will be understood that the various example embodiments are intended to be illustrative, not limiting. It will be further understood by those skilled in the art that various modifications may be made without departing from the true spirit and full scope of the disclosure, including the appended claims.

What is claimed is:

1. An electronic apparatus comprising:
a memory storing at least one instruction; and
a processor connected with the memory and configured, by executing the at least one instruction, to control the electronic apparatus to:
acquire a voice command,
perform voice recognition of the voice command and acquire a first text,
identify an indexed word prestored in the memory among a plurality of words included in the first text,
identify a rule template among a plurality of rule templates prestored in the memory, including the indexed word and slots matched to at least one word excluding the indexed word among the plurality of words, and
acquire a control command corresponding to the voice command based on the identified rule template,
wherein the rule template comprises at least one of a closed slot wherein words that can be matched in the slot are limited or an open slot wherein words that can be matched in the slot are unlimited, and
wherein the processor is configured to control the electronic apparatus to:
identify a plurality of rule templates among the plurality of prestored rule templates,
identify one or more first rule templates wherein a total number of the words and the slots is largest among the plurality of rule templates, as a rule template corresponding to the voice command,
based on a number of the identified first rule templates being plural, identify one or more second rule templates wherein a number of slots is smallest among the identified first rule templates, the rule template corresponding to the voice command,
based on a number of the identified second rule templates being plural, identify a third rule template wherein a number of open slots is smallest among the identified second rule templates, as the rule template corresponding to the voice command; and
execute the voice command based on the rule template corresponding to the voice command.

2. The electronic apparatus of claim 1, wherein the processor is configured to control the electronic apparatus to:
convert the voice command into text data through an automatic speech recognition (ASR) module, and
convert the text data into a first text through a sentence analysis module.

3. The electronic apparatus of claim 1,
wherein, in respective words excluding the slots in the plurality of rule templates, identification numbers of the rule templates including the words and locations of the words in the rule templates are indexed, and
the processor is configured to control the electronic apparatus to:
identify a word for which indexing was performed in the first text, and identify the location of the identified word in the first text.

4. The electronic apparatus of claim 3, wherein the processor is configured to control the electronic apparatus to:
identify at least one first rule template which includes the indexed word, and which corresponds to the location of the identified indexed word among the plurality of prestored rule templates, and
identify at least one second rule template in which slots are matched by the at least one word excluding the indexed word among the plurality of words included in the first text in the identified at least one first rule template.

5. The electronic apparatus of claim 1, wherein the processor is configured to control the electronic apparatus to:
acquire the first text by extending postpositions included in the voice command and performing generalization for the words included in the voice command.

6. The electronic apparatus of claim 1, wherein, based on a closed slot being included in the identified template, a word of a type corresponding to the closed slot is included in the first text.

7. The electronic apparatus of claim 1, wherein, based on the open slot being included in the identified template, the open slot is matched through words excluding the indexed word in the first text.

8. A non-transitory computer-readable storage medium storing instructions for controlling an electronic apparatus, the instructions comprising instructions for:
acquiring a voice command;
performing voice recognition of the voice command and acquiring a first text;
identifying a prestored indexed word among a plurality of words included in the first text;
among a plurality of prestored rule templates, identifying a rule template including the indexed word and slots matched to at least one word excluding the indexed word among the plurality of words; and
acquiring a control command corresponding to the voice command based on the identified rule template,
wherein the rule template comprises at least one of a closed slot wherein words that can be matched in the slot are limited or an open slot wherein words that can be matched in the slot are unlimited,
wherein the identifying the rule template comprises:
identifying a plurality of rule templates among the plurality of prestored rule templates,
identifying one or more first rule templates wherein a total number of the words and the slots is largest among the plurality of rule templates, as a rule template corresponding to the voice command,
based on a number of the identified first rule templates being plural, identifying one or more a second rule templates wherein a number of slots is smallest among the identified first rule templates, as the rule template corresponding to the voice command, and
based on a number of the identified second rule templates being plural, identifying a third rule template wherein a number of open slots is smallest among the identified second rule templates, as the rule template corresponding to the voice command, and
wherein the instructions comprise instructions for causing the voice command to be executed based on the rule template corresponding to the voice command.

9. The non-transitory computer-readable storage medium of claim 8, comprising instructions for:
converting the voice command into text data through an automatic speech recognition (ASR) module; and
converting the text data into a first text through a sentence analysis module.

10. The non-transitory computer-readable storage medium of claim 8, wherein, in respective words excluding the slots in the plurality of rule templates, identification numbers of the rule templates including the words and locations of the words in the rule templates are indexed, and the instructions comprise instructions for:
- identifying a word for which indexing was performed in the first text, and identifying the location of the identified word in the first text.

11. The non-transitory computer-readable storage medium of claim 10 comprising instructions for:
- identifying at least one first rule template including the indexed word, and which corresponds to the location of the identified indexed word among the plurality of prestored rule templates; and
- identifying at least one second rule template of which slots are matched by the at least one word excluding the indexed word among the plurality of words included in the first text in the identified at least one first rule template.

* * * * *